(12) United States Patent
Knaappila

(10) Patent No.: US 12,666,381 B2
(45) Date of Patent: Jun. 23, 2026

(54) CLOCK SYNCHRONIZATION METHOD

(71) Applicant: Silicon Laboratories Inc., Austin, TX (US)

(72) Inventor: Jere Knaappila, Espoo (FI)

(73) Assignee: Silicon Laboratories Inc., Austin, TX (US)

( * ) Notice: Subject to any disclaimer, the term of this patent is extended or adjusted under 35 U.S.C. 154(b) by 575 days.

(21) Appl. No.: 18/195,582

(22) Filed: May 10, 2023

(65) Prior Publication Data

US 2024/0381279 A1 Nov. 14, 2024

(51) Int. Cl.
*H04W 56/00* (2009.01)
(52) U.S. Cl.
CPC ....... *H04W 56/005* (2013.01); *H04W 56/001* (2013.01)

(58) Field of Classification Search
CPC ............. H04W 76/20; H04W 74/0838; H04W 74/0841; H04W 74/085; H04W 74/0858; H04W 74/0866; H04W 74/0875; H04W 74/0883; H04W 74/0891; H04W 76/00; H04W 76/10; H04W 76/11; H04W 76/12; H04W 76/14; H04W 76/15; H04W 76/16; H04W 76/18; H04W 76/19; H04W 76/22; H04W 76/23; H04W 76/25; H04W 76/27; H04W 76/28; H04W 76/30; H04W 76/32; H04W 76/34; H04W 76/36; H04W 76/38
See application file for complete search history.

(56) References Cited

U.S. PATENT DOCUMENTS

| | | | |
|---|---|---|---|
| 2008/0075128 A1* | 3/2008 | Fourcand | H04J 3/0602 |
| | | | 370/520 |
| 2020/0137699 A1* | 4/2020 | Girardier | H04W 56/001 |
| 2021/0250160 A1* | 8/2021 | Ueno | H04L 7/0008 |
| 2022/0174470 A1* | 6/2022 | Stridkvist | H04W 56/0015 |
| 2022/0322253 A1* | 10/2022 | Tsunashima | H04W 56/001 |
| 2022/0417792 A1* | 12/2022 | Winder | H04W 28/06 |

FOREIGN PATENT DOCUMENTS

CN        101459502 A   *   6/2009   ............ H04J 3/0667

OTHER PUBLICATIONS

CN-101459502-A (Year: 2009).*

* cited by examiner

*Primary Examiner* — Nicholas A Jensen
*Assistant Examiner* — Ayodele Lawrence Olubodun
(74) *Attorney, Agent, or Firm* — Nields, Lemack & Frame, LLC

(57) ABSTRACT

A system and method of synchronizing the clocks between two connected BLUETOOTH® devices is disclosed. The two devices exchange packets that contain a timestamp that is indicative of the time that each device received a packet from the other device. By exchanging this information, each device may determine the offset between its internal clock and the internal clock of the other device. Once clock synchronization is achieved, the central device may transmit packets to the peripheral requesting that particular actions be taken at specific times.

18 Claims, 7 Drawing Sheets

| APPLICATION 200 |
| :---: |
| BLUETOOTH® STACK 210 |
| LINK LAYER 220 |
| HARDWARE (NETWORK INTERFACE 30) |

FIG. 2

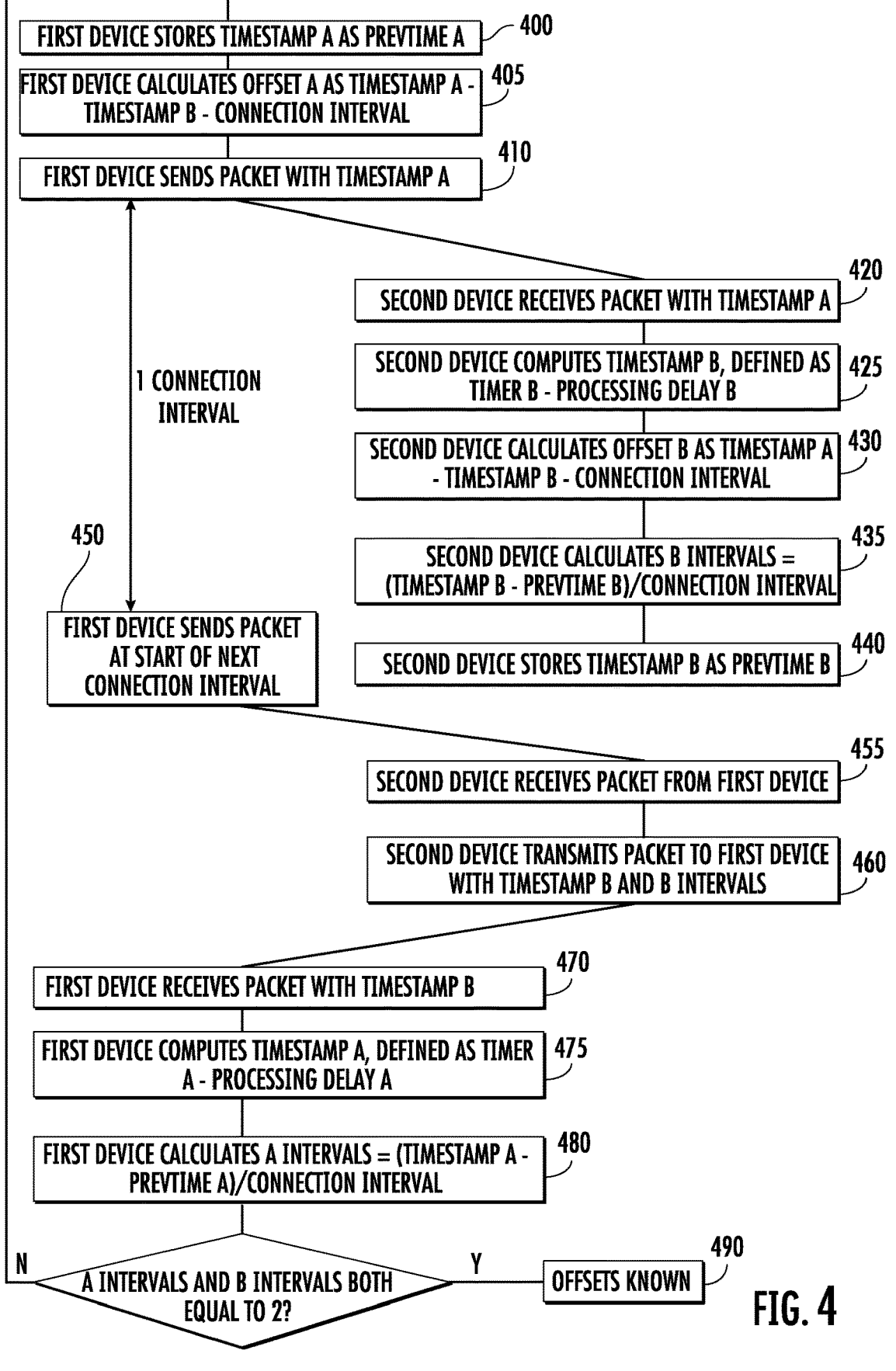

FIRST DEVICE STORES TIMESTAMP A AS PREVTIME A — 400

FIRST DEVICE CALCULATES OFFSET A AS TIMESTAMP A - TIMESTAMP B - CONNECTION INTERVAL — 405

FIRST DEVICE SENDS PACKET WITH TIMESTAMP A — 410

SECOND DEVICE RECEIVES PACKET WITH TIMESTAMP A — 420

SECOND DEVICE COMPUTES TIMESTAMP B, DEFINED AS TIMER B - PROCESSING DELAY B — 425

SECOND DEVICE CALCULATES OFFSET B AS TIMESTAMP A - TIMESTAMP B - CONNECTION INTERVAL — 430

SECOND DEVICE CALCULATES B INTERVALS = (TIMESTAMP B - PREVTIME B)/CONNECTION INTERVAL — 435

SECOND DEVICE STORES TIMESTAMP B AS PREVTIME B — 440

1 CONNECTION INTERVAL

450

FIRST DEVICE SENDS PACKET AT START OF NEXT CONNECTION INTERVAL

SECOND DEVICE RECEIVES PACKET FROM FIRST DEVICE — 455

SECOND DEVICE TRANSMITS PACKET TO FIRST DEVICE WITH TIMESTAMP B AND B INTERVALS — 460

FIRST DEVICE RECEIVES PACKET WITH TIMESTAMP B — 470

FIRST DEVICE COMPUTES TIMESTAMP A, DEFINED AS TIMER A - PROCESSING DELAY A — 475

FIRST DEVICE CALCULATES A INTERVALS = (TIMESTAMP A - PREVTIME A)/CONNECTION INTERVAL — 480

N     A INTERVALS AND B INTERVALS BOTH EQUAL TO 2?     Y — OFFSETS KNOWN — 490

FIG. 4

CLOCK SYNCHRONIZATION METHOD

FIELD

This disclosure describes a system and method to synchronize the internal clocks of two connected network devices using a BLUETOOTH® protocol.

BACKGROUND

The BLUETOOTH® protocol is one of many wireless network protocols that are currently in use. The BLUETOOTH® protocol is commonly used to connect smartphones to watches, headphones, speakers, and other accessories. BLUETOOTH® LOW Energy utilizes 40 physical channels in the 2.4 GHz ISM band, each channel separated by 2 MHz.

One concept in the BLUETOOTH® protocol is a connection. A connection is formed between a central device and a peripheral device. Once established, communications between the two devices occur in a well defined manner. Specifically, the central device provides a parameter, referred to as connInterval, to the peripheral device, which is the connection interval. This connection interval is a multiple of 1.25 milliseconds in the range from 7.5 milliseconds to 4 seconds. The start of each connection interval may be referred to as the connection anchor point. At each connection anchor point, the central device transmits a packet to the peripheral device. The peripheral device may then respond to this packet. Each packet that is transmitted is referred to as a connection event. In some embodiments, there may be multiple connection events during a connection interval.

While both the central device and the peripheral device are synchronized to the connection interval, they do not share a common time reference. In another words, each is able to measure the time between connection anchor points; however, neither knows the actual clock value of the other device.

Further, the BLUETOOTH® protocol does not provide a method to acquire this clock synchronization information.

Therefore, it would be beneficial if there was a system and method that allowed two BLUETOOTH® devices to synchronize their internal clocks. In this way, the central device can request that certain action be taken by the peripheral device at specific times.

SUMMARY

A system and method of synchronizing the clocks between two connected BLUETOOTH® devices is disclosed. The two devices exchange packets that contain a timestamp that is indicative of the clock value that each device received a packet from the other device. By exchanging this information, each device may determine the offset between its internal clock and the internal clock of the other device. Once clock synchronization is achieved, the central device may transmit packets to the peripheral requesting that particular actions be taken at specific times.

According to one embodiment, a method of synchronizing internal clocks between a first BLUETOOTH® device having a first clock and a second BLUETOOTH® device having a second clock is disclosed. The method comprises transmitting, from the first BLUETOOTH® device, a request for synchronization; receiving, at the second BLUETOOTH® device, the request for synchronization; determining, at the second BLUETOOTH® device, a value of the second clock when the request for synchronization was received, referred to as Timestamp B; transmitting a packet from the second BLUETOOTH® device to the first BLUETOOTH® device that contains a value of Timestamp B; receiving, at the first BLUETOOTH® device, the packet with Timestamp B; determining, at the first BLUETOOTH® device, a value of the first clock when the packet was received, referred to as Timestamp A; and calculating, at the first BLUETOOTH® device, an offset between the first clock and the second clock using Timestamp A and Timestamp B.

In some embodiments, the offset is transmitted by the first BLUETOOTH® device to the second BLUETOOTH® device. In certain embodiments, after transmitting the offset to the second BLUETOOTH® device, the first BLUETOOTH® device transmits a packet to the second BLUETOOTH® device, wherein the packet includes an action to performed at a desired time, wherein the desired time is referenced to the first clock; and wherein the second BLUETOOTH® device receives the packet, converts the desired time to a value referenced to the second clock and performs the action at the desired time.

In some embodiments, the first BLUETOOTH® device and the second BLUETOOTH® device are connected, wherein communications between the first BLUETOOTH® device and the second BLUETOOTH® device are referenced to connection anchor points, wherein sequential connection anchor points are separated by a connection interval. In certain embodiments, the synchronization request and the packet transmitted by the second BLUETOOTH® device are transmitted during consecutive connection intervals.

In some embodiments, the method further comprises transmitting a packet from the first BLUETOOTH® device to the second BLUETOOTH® device that contains the value of Timestamp A; and calculating, at the first BLUETOOTH® device and at the second BLUETOOTH® device, an offset between the first clock and the second clock using Timestamp A and Timestamp B. In certain embodiments, the method further comprises saving a previous value of Timestamp B, referred to as PrevTimeB; and generating a value, referred to as B Intervals, based on a difference between Timestamp B and PrevTimeB and a duration of a connection interval. In certain embodiments, the method further comprises transmitting from the second BLUETOOTH® device a packet containing a value of B Intervals to the first BLUETOOTH® device. In certain embodiments, the method further comprises saving a previous value of Timestamp A, referred to as PrevTimeA, at the first BLUETOOTH® device; receiving a second packet from the second BLUETOOTH® device containing a value of Timestamp B and the value of B Intervals; determining, at the first BLUETOOTH® device, a value of the first clock when the second packet was received, referred to as Timestamp A; and comparing a difference between Timestamp A and PrevTimeA to the duration of a connection interval to determine if retries occurred. In certain embodiments, the first BLUETOOTH® device uses B Intervals to determine if retries occurred. In certain embodiments, the first BLUETOOTH® device transmits another packet containing a value of Timestamp A if it determines that retries occurred.

According to another embodiment, a system is disclosed. The system comprises a first BLUETOOTH® device having a first clock; and a second BLUETOOTH® device having a second clock; wherein the first BLUETOOTH® device transmits a request for synchronization; wherein the second BLUETOOTH® device receives the request for synchronization; determines a value of the second clock when the request for synchronization was received, referred to as Timestamp B and transmits a packet to the first BLUETOOTH® device that contains a value of Timestamp B; and wherein the first BLUETOOTH® device receives the packet with Timestamp B, determines a value of the first clock when the packet was received, referred to as Timestamp A; and calculates an offset between the first clock and the second clock using Timestamp A and Timestamp B.

In some embodiments, the first BLUETOOTH® device transmits a packet to the second BLUETOOTH® device that contains the value of Timestamp A; and wherein the first BLUETOOTH® device and the second BLUETOOTH® device each calculate an offset between the first clock and the second clock using Timestamp A and Timestamp B. In certain embodiments, after calculating the offset, the first BLUETOOTH® device transmits a packet to the second BLUETOOTH® device, wherein the packet includes an action to performed at a desired time, wherein the desired time is referenced to the first clock; and wherein the second BLUETOOTH® device receives the packet, converts the desired time to a value referenced to the second clock and performs the action at the desired time.

In certain embodiments, the second BLUETOOTH® device saves a previous value of Timestamp B, referred to as PrevTimeB; generates a value, referred to as B Intervals, based on a difference between Timestamp B and PrevTimeB and a duration of a connection interval; and transmits a packet containing a value of B Intervals to the first BLUETOOTH® device. In certain embodiments, the first BLUETOOTH® device saves a previous value of Timestamp A, referred to as PrevTimeA; receives a second packet from the second BLUETOOTH® device containing a value of Timestamp B and the value of B Intervals; determines a value of the first clock when the second packet was received, referred to as Timestamp A; and compares a difference between Timestamp A and PrevTimeA to the duration of a connection interval to determine if retries occurred. In certain embodiments, the first BLUETOOTH® device uses B Intervals to determine if retries occurred. In certain embodiments, the first BLUETOOTH® device transmits another packet containing a value of Timestamp A if it determines that retries occurred.

BRIEF DESCRIPTION OF THE DRAWINGS

For a better understanding of the present disclosure, reference is made to the accompanying drawings, in which like elements are referenced with like numerals, and in which:

FIG. 2 shows a high level illustration of the software architecture of the devices;

FIG. 4 shows a second flow chart showing another approach to synchronizing clocks between two devices;

DETAILED DESCRIPTION

This disclosure describes a method by which two BLUETOOTH® devices may synchronize their respective internal clocks.

Figure 1A:
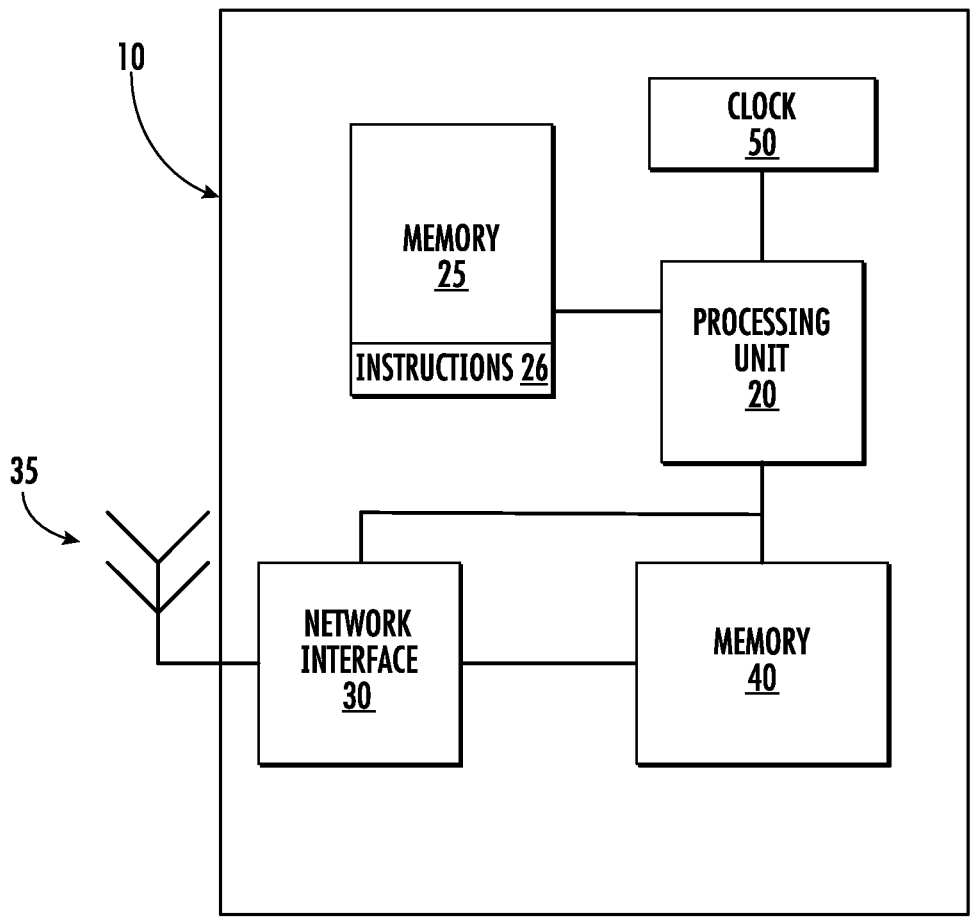
FIG. 1A shows a block diagram of a BLUETOOTH® device according to one embodiment.

FIG. 1A shows a block diagram of a representative BLUETOOTH® device 10 that may be used to implement the disclosed method of synchronizing clocks between two devices.

The BLUETOOTH® device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions 26, which, when executed by the processing unit 20, enable the BLUETOOTH® device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1A. The second computer readable non-transitory media may be a CDROM, or a different memory device, which is located remote from the BLUETOOTH® device 10. The instructions contained on this second computer readable non-transitory media may be downloaded onto the memory device 25 to allow execution of the instructions by the BLUETOOTH® device 10.

The BLUETOOTH® device 10 also includes a BLUETOOTH® network interface 30 that connects with a BLUETOOTH® network 100 using an antenna 35.

The BLUETOOTH® device 10 may include a second memory device 40 in which data that is received and transmitted by the BLUETOOTH® network interface 30 is stored. This second memory device 40 is traditionally a volatile memory. The processing unit 20 has the ability to read and write the second memory device 40 so as to communicate with the other devices in the BLUETOOTH® network 100.

The BLUETOOTH® device 10 may also include an internal clock 50. The internal clock 50 may be a free running timer, which is incremented at a predetermined rate. In some embodiments, the BLUETOOTH® device 10 may include a crystal. The frequency of the crystal may be greater than that of the internal clock 50. For example, the crystal may operate at a frequency greater than 1 MHz, while the internal clock 50 may be incremented at a rate of 1 MHz or less. The frequency of the internal clocks of the two devices may be the same.

Although not shown, the BLUETOOTH® device 10 also has a power supply, which may be a battery or a connection to a permanent power source, such as a wall outlet.

While the processing unit 20, the memory device 25, the BLUETOOTH® network interface 30, the internal clock 50 and the second memory device 40 are shown in FIG. 1A as separate components, it is understood that some or all of these components may be integrated into a single electronic component. Rather, FIG. 1A is used to illustrate the functionality of the BLUETOOTH® device 10, not its physical configuration.

Figure 1B:
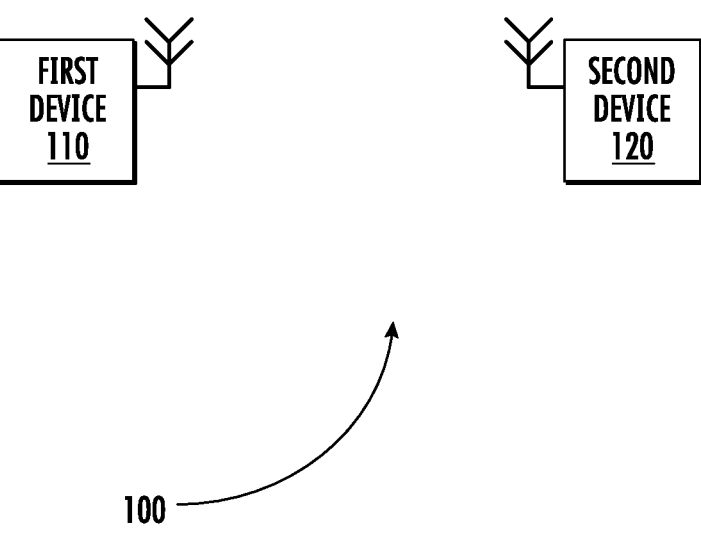
FIG. 1B shows a BLUETOOTH® network including a central device and a peripheral device.

FIG. 1B shows a BLUETOOTH® network 100 that includes a central device, also referred to as the first BLUETOOTH® device 110 or device A, and a peripheral device, also referred to as the second BLUETOOTH® device 120 or device B. The first BLUETOOTH® device 110 and the second BLUETOOTH® device 120 may have an architecture similar to that shown in FIG. 1A.

To establish a connection, the first BLUETOOTH® device 110 may transmit a CONNECT_IND PDU on the primary advertising channel to the second BLUETOOTH® device 120. The second BLUETOOTH® device 120 may respond with an AUX_CONNECT_RSP PDU on the secondary advertising channel. Packets can then be transmitted between the first BLUETOOTH® device 110 and the second BLUETOOTH® device 120. These devices are deemed to be in a connected state. As part of the establishment of the connection, the first BLUETOOTH® device 110 may provide a parameter, known as connInterval, or connection interval, to the second BLUETOOTH® device 120. This parameter informs the second BLUETOOTH® device 120 when packets are to be transmitted by the first BLUETOOTH® device 110. This connection interval is a multiple of 1.25 milliseconds in the range from 7.5 milliseconds to 4 seconds. The start of each connection interval may be referred to as the connection anchor point. At each connection anchor point, the central device transmits a packet to the peripheral device. The peripheral device may then respond to this packet. Each packet that is transmitted is referred to as a connection event. In some embodiments, there may be multiple connection events during a connection interval. This allows the second BLUETOOTH® device 120 to enter a sleep mode for extended periods of time between connection anchor points.

FIG. 2 shows the software architecture of a typical BLUETOOTH® device 10. At the lowest level is the hardware, which includes the BLUETOOTH® network interface 30. The link layer 220 interfaces with the hardware and is used to maintain the physical connection, including retries, data encoding/decoding and other functions. The BLUETOOTH® stack 210 includes all of the BLUETOOTH® network functionality that is disposed between the application 200 and the link layer 220. In some embodiments, the BLUETOOTH® stack 210 and the link layer 220 may be disposed in separate components. In this embodiment, the link layer 220 and the BLUETOOTH® stack 210 may communicate using a HCl (Host Controller Interface). The application 200 is disposed on top of the BLUETOOTH® stack 210, and typically is not concerned with the specifics of the underlying network. Rather, the application 200 may be a software that is used by a user to control a peripheral, such as a printer application, or another device. The application 200 may also operate autonomously. For example, based on the proximity of other devices, the application 200 may perform some function.

While the application 200 may be aware of the connection interval, it does not any other access to timing information used by the two devices. As a prerequisite for the present method, both the first BLUETOOTH® device 110 and the second BLUETOOTH® device 120 measure their process delay. This process delay is the time from when the BLUETOOTH® network interface 30 receives the packet from the BLUETOOTH® network 100 to the time when that packet is available to the application 200. This time is typically very predictable and may be measured in a variety of ways. For example, this time may be measured using external equipment, which may detect when a packet has been received and receives some indication that the packet is available to the application 200. Alternatively, this time may be measured by the application 200, if it has access to the timestamp of the packet when it was received and the internal clock that was used to measure it. Throughout this disclosure, the term "Processing Delay A" is used to define the time between when the BLUETOOTH® network interface 30 on the first BLUETOOTH® device 110 receives a packet from the second BLUETOOTH® device 120 and when that packet is made available to the application 200 resident in the first BLUETOOTH® device 110. Similarly, the term "Processing Delay B" is used to define the time between when the BLUETOOTH® network interface 30 on the second BLUETOOTH® device 120 receives a packet from the first BLUETOOTH® device 110 and when that packet is made available to the application 200 resident in the second BLUETOOTH® device 120. Additionally, the internal clock 50 of the first BLUETOOTH® device 110 may be referred to as the first clock, while the internal clock of the second BLUETOOTH® device 120 may be referred to as the second clock.

Once the processing delay is determined, it is possible for the application 200 to determine when the packet actually arrives at the respective device by subtracting the processing delay from the current value of the internal clock 50.

Figure 3:
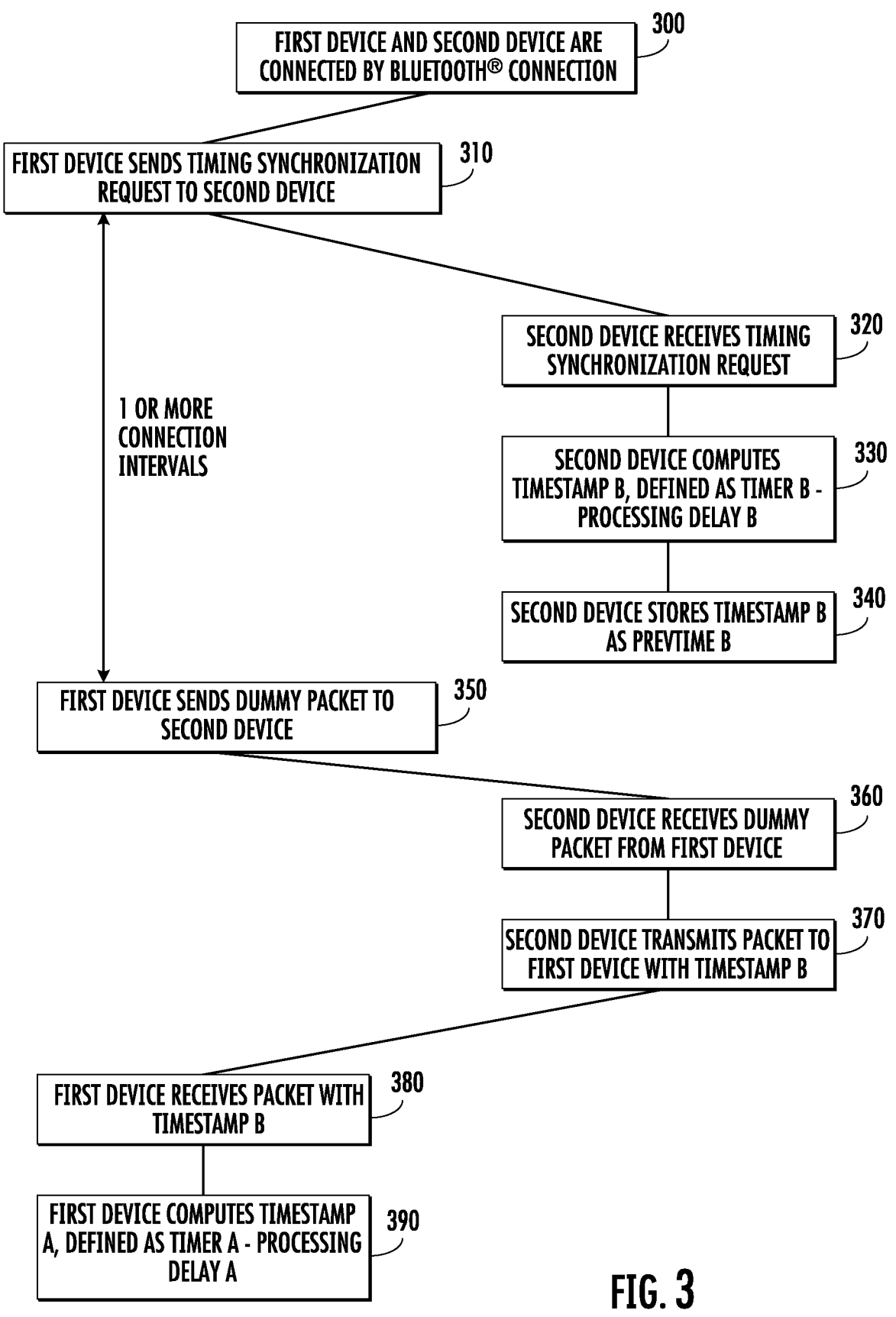
FIG. 3 shows a flow chart showing a first approach to synchronizing clocks between two devices.
Figure 5:
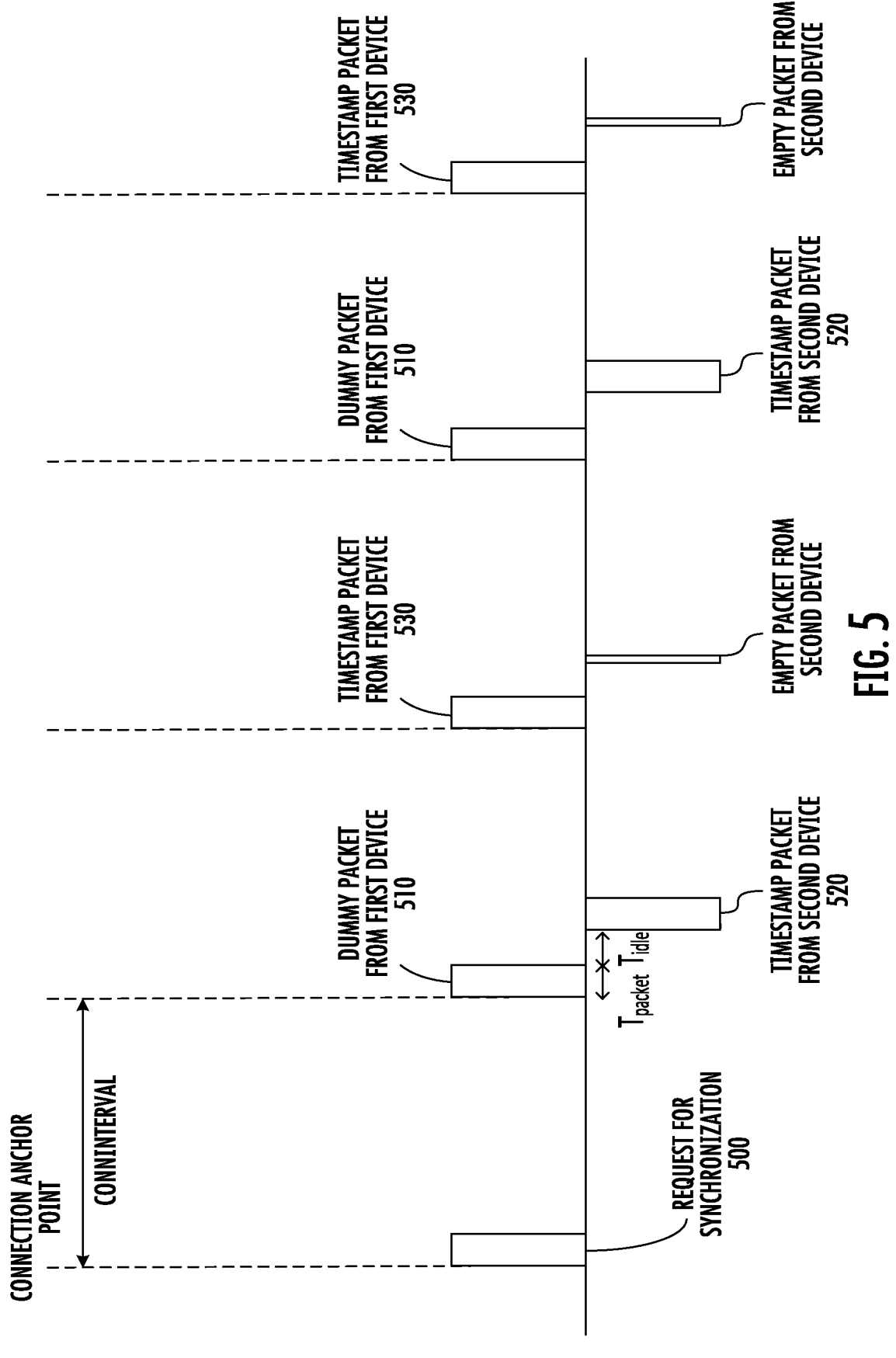
FIG. 5 shows a timing diagram showing the packet transmissions associated with FIGS. 3-4.

FIG. 3 shows a first part of the method of synchronizing the clocks between the first BLUETOOTH® device 110 and the second BLUETOOTH® device 120. A timing diagram that shows this sequence is illustrated in FIG. 5. First, as shown in Box 300, and described above, a connection is established between the first BLUETOOTH® device 110 and the second BLUETOOTH® device 120. This establishes the connection anchor point and the connection interval. Next, the first BLUETOOTH® device 110 transmits a packet that includes a timing synchronization request 500 to the second BLUETOOTH® device 120, as shown in Box 310. This packet may be transmitted as the first packet of a connection interval. This packet is received by the second BLUETOOTH® device 120, as shown in Box 320. The application 200 resident on the second BLUETOOTH® device 120 then receives the packet. The application 200 resident on the second BLUETOOTH® device 120 uses the current value of the internal clock 50 (i.e., the second clock) and subtracts Processing Delay B from this value to determine the value of the internal clock 50 when the packet was received by the BLUETOOTH® network interface 30, as shown in Box 330. This value is referred to as Timestamp B and is referenced to the second clock. The application 200 resident on the second BLUETOOTH® device 120 is now aware of the timing of connection anchor points with respect to the second clock. The application 200 then saves this value, Timestamp B, as PrevTime B, as shown in Box 340. This value is used later as explained below.

During the next connection interval, the first BLUETOOTH® device 110 transmits a packet, as shown in Box 350. This may be a dummy packet 510 that is transmitted because a connection interval always begins with a packet from the central device. In this case, the length of the dummy packet is known and therefore its duration, $T_{packet}$, can be readily determined. The second BLUETOOTH® device 120 receives this dummy packet, which indicates the start of another connection interval, as shown in Box 360. Next, the second BLUETOOTH® device 120 transmits a timestamp packet 520 to the first BLUETOOTH® device 110, as shown in Box 370. The timing between the receipt of the dummy packet 510 and the transmission of the timestamp packet 520 to the first BLUETOOTH® device 110, $T_{idle}$, is also known, and is defined in the BLUETOOTH® specification. This timestamp packet 520 contains the value of Timestamp B. This timestamp packet 520 may be sent during the current connection interval, or at a later time.

Next, as shown in Box 380, the first BLUETOOTH® device 110 receives the timestamp packet 520 containing Timestamp B from the BLUETOOTH® device 120. The application 200 on the first second BLUETOOTH® device 110 then receives this timestamp packet. As explained above, and shown in Box 390, the application subtracts Processing Delay A from the current value of the internal clock 50 (i.e., the first clock) in the first BLUETOOTH® device 110 to compute Timestamp A, which is the time that the timestamp packet 520 from the second BLUETOOTH® device 120 was received by the BLUETOOTH® network interface 30 of the first BLUETOOTH® device 110 referenced to the first clock. By determining Timestamp A, the application 200 is aware of the timing of the connection intervals. Thus, the first BLUETOOTH® device 110 now has Timestamp A and Timestamp B, and may use these as a rough synchronization of the two devices. For example, in some embodiments, the offset between Timestamp A and Timestamp may be estimated as Timestamp A−ConnInterval−Timestamp B. In other words, since the packet that was used to generate Timestamp A was transmitted in a subsequent connection interval, the reference points for Timestamp A and Timestamp B are different connection anchor points. Therefore, the duration of a connection interval is subtracted from the Timestamp A to attempt to align the two timestamps to the same connection anchor point. In some embodiments, the first BLUETOOTH® device 110 may further refine the offset between the timestamps by subtracting $T_{packet}$ and $T_{idle}$ from the value of Timestamp A. This reduction accounts for the delay from the connection anchor point to when the second BLUETOOTH® device 120 transmitted the packet that was used to generate Timestamp A. Thus, in this embodiment, the offset would be defined as Timestamp A−$T_{packet}$−$T_{idle}$−ConnInterval−Timestamp B. In some embodiments, this offset is then transmitted by the first BLUETOOTH® device 110 to the second BLUETOOTH® device 120.

In other embodiments, the packet containing Timestamp B may not have been transmitted during the next connection interval. Therefore, in some embodiments, the first BLUETOOTH® device 110 may compare the clock value when the timing synchronization request 500 was transmitted to the clock value when the timestamp packet 520 was received. The difference between these two clock values is then divided by the connection interval. This result is that number of connection intervals (N) that elapsed between the two packets. This number of connection intervals (N) is then used to calculate the offset as follows:

$$Timestamp\ A - N * ConnInterval - Timestamp\ B$$

In certain embodiments, the offset may be defined as Timestamp A−$T_{packet}$−$T_{idle}$−N*ConnInterval−Timestamp B. As noted above, in some embodiments, this offset is then transmitted by the first BLUETOOTH® device 110 to the second BLUETOOTH® device 120.

FIG. 4 shows a method whereby a more accurate clock synchronization may be performed. This flowchart is a continuation of that illustrated in FIG. 3. FIG. 5 shows a timing diagram of this process. First, as shown in Box 400, the application 200 in the first BLUETOOTH® device 110 saves the Timestamp A as PrevTime A. Then, as shown in Box 405, the first BLUETOOTH® device 110 then calculates an offset A, which is defined as the difference between the first clock and the second clock. This offset A may be calculated using Timestamp A and Timestamp B. In some embodiments, offset A is defined as Timestamp A less Timestamp B. This value is then adjusted by subtracting the value of one connection interval. In other words, ideally, the packet with Timestamp B was sent by the second BLUETOOTH® device 120 during the next connection interval. Thus, the value of Timestamp A is actually greater than Timestamp B by the time duration of one connection interval. Thus, to adjust for this, offset A is calculated as Timestamp A−Timestamp B−ConnInterval. In some embodiments, the first BLUETOOTH® device 110 may refine the calculation of offset A by subtracting ($T_{packet}$+ $T_{idle}$) from the offset described above. The first BLUETOOTH® device 110 then transmits a timestamp packet 530 to the second BLUETOOTH® device 120 with the value of Timestamp A, as shown in Box 410. Note that this packet may be transmitted during the connection interval following the connection interval during which the packet from the second BLUETOOTH® device 120 was received. In another embodiment, this packet may be transmitted immediately after the reception of the packet from the second BLUETOOTH® device 120.

As shown in Box 420, the second BLUETOOTH® device 120 receives the timestamp packet 530 from the first BLUETOOTH® device 110. As described above and shown in Box 425, the second BLUETOOTH® device 120 computes Timestamp B, based on the current values of the second clock and the Processing Delay B. As shown in Box 430, the application in the second BLUETOOTH® device 120 then calculates offset B, which is the difference between the first clock and the second clock, as explained above. The offset B may be Timestamp A−ConnInterval−Timestamp B, or may be Timestamp A−ConnInterval−$T_{packet}$−$T_{idle}$−Timestamp B, as described above. The second BLUETOOTH® device 120, in Box 435, then calculates a parameter referred to as B intervals, which is defined as the difference between the current Timestamp B and the previously computed Timestamp B, which has been saved as PrevTime B, divided by the duration of the connection interval, ConnInterval. In other words, the value of B intervals represents the number of connection intervals that occurred between receipt of the previous timestamp packet from the first BLUETOOTH® device 110 and the timestamp packet that was just received. This value is rounded to the nearest whole number. If there are no errors, the previous timestamp packet from the first BLUETOOTH® device 110 was transmitted during connection interval N, the response from the second BLUETOOTH® device 120 was transmitted during connection interval N+1, and the current timestamp packet from the first BLUETOOTH® device 110 was transmitted during connection interval N+2. Thus, ideally, the value of B intervals should be 2. If it is larger than this, that implies that there were retries or other errors. The second BLUETOOTH® device 120 then saves Timestamp B as PrevTime B, overwriting the previous value, as shown in Box 440.

At the start of the next connection interval, the first BLUETOOTH® device 110 transmits a packet, such as a dummy packet 510, to the second BLUETOOTH® device 120, as shown in Box 450. The second BLUETOOTH® device 120 receives this dummy packet 510, as shown in Box 455. Next, as shown in Box 460, the second BLU-ETOOTH® device 120 transmits a timestamp packet 520 to the first BLUETOOTH® device 110. This packet contains the value of Timestamp B and also includes the value of B intervals, or an indication of that value.

As shown in Box 470, the first BLUETOOTH® device 110 receives the timestamp packet 520 containing the values of Timestamp B and B interval. In Box 475, the first BLUETOOTH® device 110 then computes Timestamp A, as described above. In Box 480, the first BLUETOOTH® device 110 then calculates A intervals, using the same algorithm as described above for B intervals. The first BLUETOOTH® device 110 then checks to see if both A intervals and B intervals have a value of 2. If both values are 2, then the synchronization process is complete, and the first BLUETOOTH® device 110 and the second BLU-ETOOTH® device 120 can use Offset A and Offset B, respectively, to convert the value of the first clock in the first BLUETOOTH® device 110 to the value of the second clock in the second BLUETOOTH® device 120. If, however, both values are not 2, this implies that retries or some other transmission error occurred. In this case, the entire sequence shown in FIG. 4 is repeated. Note that when complete, Offset A and Offset B are equal.

Note that the description above assumes that timestamp packets 530 from the first BLUETOOTH® device 110 occur during the next connection interval following the receipt of the timestamp packet 520 from the second BLUETOOTH® device 120. However, in other embodiments, the first BLU-ETOOTH® device 110 may transmit the timestamp packet 530 immediately following the receipt of the timestamp packet 520. In this embodiment, the sequence is as shown in FIGS. 3-4. However, in this embodiment, the values of A intervals and B intervals would be 1 if no retries occurred.

As noted above, in some embodiments, the offsets are calculated using the expression TimeStamp A−ConnInterval−Timestamp B. In many instances, this degree of synchronization may be sufficient. Note that in other embodiments, this offset is further refined by subtracting $T_{packet}$ and $T_{idle}$ from the expression noted above. In other embodiments, only one of $T_{packet}$ and $T_{idle}$ is subtracted from the expression above.

Note that FIG. 4 shows calculations and other operations being performed by the second BLUETOOTH® device 120. Specifically, the second BLUETOOTH® device 120 calculates Offset B (Box 430), calculates B intervals (Box 435) and stores the previous value of Timestamp B (Box 440). However, in another embodiment, these operations may be performed by the first BLUETOOTH® device 110, since it contains all of the information needed to perform these operations. In this case, after the process is complete (Box 490), the first BLUETOOTH® device 110 transmits a packet to the second BLUETOOTH® device 120 that contains Offset B.

Figure 6:
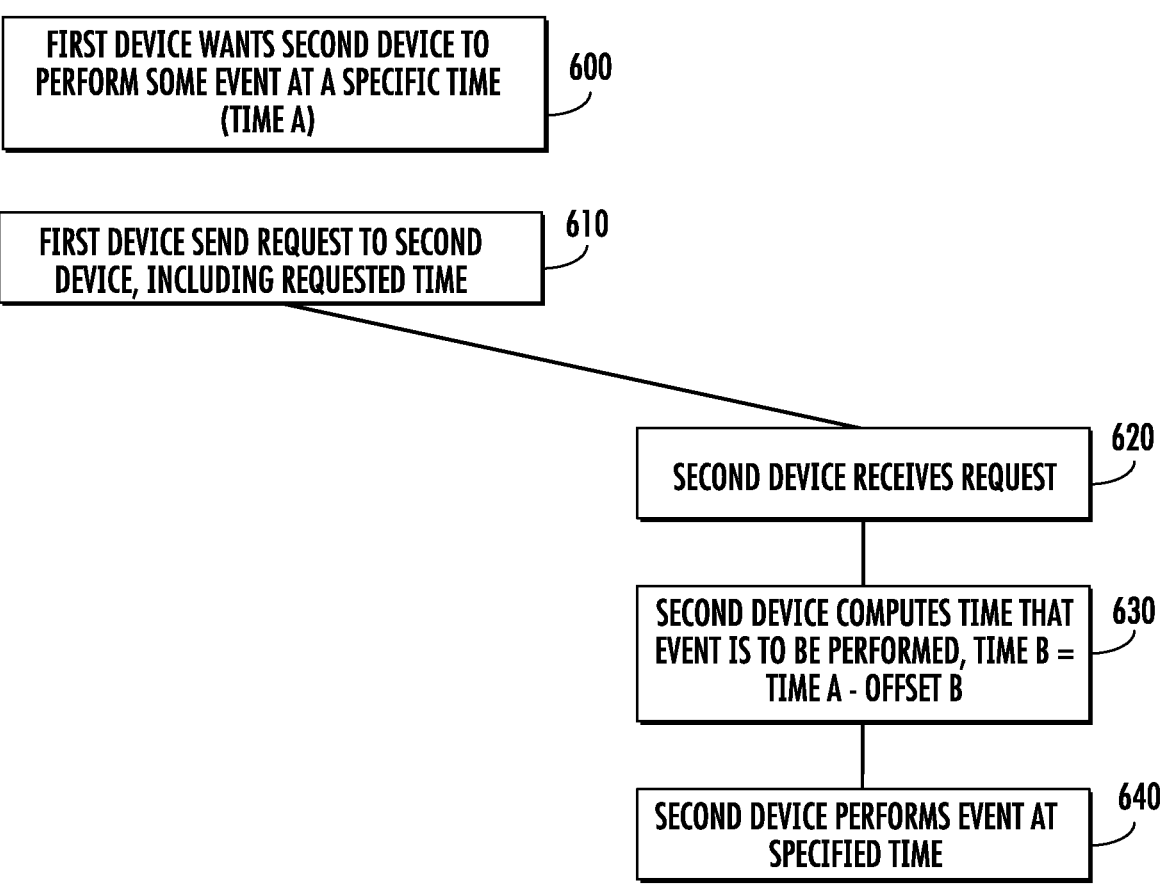
FIG. 6 shows a flowchart demonstrating use of the synchronized clocks.

FIG. 6 shows the use of the method illustrated in FIGS. 3 and 4. In this embodiment, as shown in Box 600, the application 200 on the first BLUETOOTH® device 110 wants an event to be performed by the second BLU-ETOOTH® device 120 sometime in the future. This time is referenced to the internal clock 50 in the first BLU-ETOOTH® device 110, and is referred to as Time A. In Box 610, the first BLUETOOTH® device 110 transmits this request to the second BLUETOOTH® device 120, including Time A. As shown in Box 620, the second BLUETOOTH® device 120 receives this request. The second BLU- ETOOTH® device 120 then converts the time provided by the first BLUETOOTH® device 110 (Time A) into a value that is referenced to its internal clock 50. This may be done by subtracting Offset B from Time A, as shown in Box 630. The second BLUETOOTH® device 120 then performs the requested event at the specified time, as shown in Box 640. For example, accurate timestamps may be used to synchronize sensor measurements. In another embodiment, accurate timestamps may be used to determine when to enable an ultra-wide band (UWB) or other high power radio.

The present system and method have many advantages. As noted above, the BLUETOOTH® protocol does not make any provisions for allowing two devices to be synchronized to one another. By performing the sequence described in FIGS. 3 and 4, the two devices are able to operate using a common time reference. This allows one device to request actions be taken by the other device at a requested time, and for the other device to be able to understand that requested time. This method may ensure synchronization between clocks to within less than 1 millisecond. In certain embodiments, the synchronization may be within less than 500 microseconds. This may be useful in certain applications, such as synchronizing the enabling of higher power radios. It may also be used to transfer actual wall time from one device, such as a mobile phone, to another device, which can then use the wall time to timestamp measurements or other events.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto t and that the present disclosure may be beneficially implemented in any number of environments for any number of purposes. Accordingly, the claims set forth below should be construed in view of the full breadth and spirit of the present disclosure as described herein.

The invention claimed is:

1. A method of synchronizing internal clocks between a first wireless network device having a first clock and a second wireless network device having a second clock, the method comprising:

transmitting, from the first wireless network device, a request for synchronization;

receiving, at the second wireless network device, the request for synchronization;

determining, at the second wireless network device, a value of the second clock when the request for synchronization was received, referred to as Timestamp B;

transmitting a first packet from the second wireless network device to the first wireless network device that contains a value of Timestamp B;

receiving, at the first wireless network device, the first packet with Timestamp B;

determining, at the first wireless network device, a value of the first clock when the first packet was received, referred to as Timestamp A;

transmitting a second packet from the first wireless network device to the second wireless network device that contains the value of Timestamp A;

saving, at the second wireless network device, a previous value of Timestamp B, referred to as PrevTimeB;

determining, at the second wireless network device, a value of the second clock when the second packet was received, referred to as Timestamp B;

generating a value, referred to as B Intervals, based on a difference between Timestamp B and PrevTimeB and a duration of a connection interval;

transmitting from the second wireless network device a third packet containing a value of Timestamp B and B Intervals to the first wireless network device;

saving a previous value of Timestamp A, referred to as PrevTimeA, at the first wireless network device;

receiving the third packet from the second wireless network device containing a value of Timestamp B and the value of B Intervals;

determining, at the first wireless network device, a value of the first clock when the third packet was received, referred to as Timestamp A;

generating a value, referred to as A Intervals, based on a difference between Timestamp A and PrevTimeA and the duration of the connection interval;

comparing a value of A Intervals and B Intervals each to a predetermined number to determine if retries occurred; and if retries did not occur, calculating, at the first wireless network device and the second wireless network device, an offset between the first clock and the second clock using Timestamp A and Timestamp B.

2. The method of claim 1, wherein the second wireless network device transmits the first packet during a different connection interval than the connection interval during which it received the request for synchronization.

3. The method of claim 2, wherein, prior to the second wireless network device transmitting the first packet, the first wireless network device transmits a dummy packet and the second wireless network device waits an idle time after receipt of the dummy packet prior to transmitting the dummy packet.

4. The method of claim 3, wherein a duration of time used to transmit the dummy packet is used in calculating the offset.

5. The method of claim 3, wherein a duration of time used to transmit the dummy packet and the idle time are used in calculating the offset.

6. The method of claim 1, wherein the first wireless network device transmits the second packet during the same connection interval as receipt of the first packet, and wherein a value of A Intervals and B Intervals greater than 1 indicates that retries occurred.

7. The method of claim 1, wherein the first wireless network device transmits the second packet during a next connection interval after receipt of the first packet, and wherein a value of A Intervals and B Intervals not equal to 2 indicates that retries occurred.

8. The method of claim 1, wherein the first wireless network device transmits another packet containing a value of Timestamp A if it determines that retries occurred.

9. The method of claim 1, wherein, after calculating the offset, the first wireless network device transmits a packet to the second wireless network device, wherein the packet includes an action to performed at a desired time, wherein the desired time is referenced to the first clock; and wherein the second wireless network device receives the packet, converts the desired time to a value referenced to the second clock and performs the action at the desired time.

10. A system comprising:

a first wireless network device having a first clock; and a second wireless network device having a second clock;

wherein the first wireless network device transmits a request for synchronization;

wherein the second wireless network device receives the request for synchronization; determines a value of the second clock when the request for synchronization was received, referred to as Timestamp B, and transmits a first packet to the first wireless network device that contains a value of Timestamp B;

wherein the first wireless network device receives the first packet with Timestamp B, determines a value of the first clock when the first packet was received, referred to as Timestamp A, and transmits a second packet to the second wireless network device that contains the value of Timestamp A;

wherein the second wireless network device saves a previous value of Timestamp B, referred to as PrevTimeB, determines a value of the second clock when the second packet was received, referred to as Timestamp B, generates a value, referred to as B Intervals, based on a difference between Timestamp B and PrevTimeB and a duration of a connection interval, and transmits a third packet containing a value of Timestamp B and a value of B Intervals to the first wireless network device;

wherein the first wireless network device saves a previous value of Timestamp A, referred to as PrevTimeA, receives the third packet from the second wireless network device containing a value of Timestamp B and the value of B Intervals, determines a value of the first clock when the third packet was received, referred to as Timestamp A, generates a value, referred to as A Intervals, based on a difference between Timestamp A and PrevTimeA and the duration of the connection interval, compares a value of A Intervals and B Intervals each to a predetermined number to determine if retries occurred; and if retries did not occur, the first wireless network device and the second wireless network device calculate an offset between the first clock and the second clock using Timestamp A and Timestamp B.

11. The system of claim 10, wherein the second wireless network device transmits the first packet during a different connection interval than the connection interval during which it received the request for synchronization.

12. The system of claim 11, wherein, prior to the second wireless network device transmitting the first packet, the first wireless network device transmits a dummy packet and the second wireless network device waits an idle time after receipt of the dummy packet before transmitting the first packet.

13. The system of claim 12, wherein a duration of time used to transmit the dummy packet is used in calculating the offset.

14. The system of claim 12, wherein a duration of time used to transmit the dummy packet and the idle time are used in calculating the offset.

15. The system of claim 10, wherein the first wireless network device transmits the second packet during the same connection interval as receipt of the first packet, and wherein a value of A Intervals and B Intervals greater than 1 indicates that retries occurred.

16. The system of claim 10, wherein the first wireless network device transmits the second packet during a next connection interval after receipt of the first packet, and wherein a value of A Intervals and B Intervals not equal to 2 indicates that retries occurred.

17. The system of claim 10, wherein the first wireless network device transmits another packet containing a value of Timestamp A if it determines that retries occurred.

18. The system of claim 10, wherein, after calculating the offset, the first wireless network device transmits a packet to the second wireless network device, wherein the packet includes an action to performed at a desired time, wherein the desired time is referenced to the first clock; and wherein the second wireless network device receives the packet, converts the desired time to a value referenced to the second clock and performs the action at the desired time.

* * * * *